Patented Dec. 19, 1950

2,534,375

UNITED STATES PATENT OFFICE 2,534,375

CREAMING OF NATURAL RUBBER LATEX

John S. Rumbold, Woodbridge, Conn., assignor to United States Rubber Company, New York, N. Y., a corporation of New Jersey No Drawing. Application April 7, 1949, Serial No. 86,120

8 Claims. (Cl. 260—822)

This invention relates to improvements in concentrating natural rubber latex, more particularly concentrating formaldehyde treated natural rubber latex by creaming with hydrophilic colloidal creaming agent.

Natural rubber latex preserved with formaldehyde, or preserved by the addition to the fresh latex of formaldehyde followed shortly by the further addition of an alkaline material such as ammonia (U. S. Patent 1,872,161) has the disadvantage that it cannot be concentrated by chemical creaming with a conventional hydrophilic colloidal creaming agent to as high a cream solids concentration as latex preserved only with ammonia or other alkaline material. The terms "Hevea latex," "natural rubber latex" and "latex" are used herein to designate the latex of the *Hevea brasiliensis* tree.

According to the present invention, the creaming rate and the cream solids concentration of a chemically creamed natural rubber latex to which formaldehyde has been added, is considerably increased by the further addition to the latex of a non-ionic surface active agent.

In carrying out the present invention, the non-ionic surface active agent may be added to the fresh latex prior to the addition of the formaldehyde, at the same time or admixed with the formaldehyde, or subsequent to the addition of the formaldehyde. The formaldehyde should, of course, be added as soon after tapping as practicable to suppress the undesirable natural enzyme activity. The pH of freshly tapped latex is about 7, and on addition of the formaldehyde, drops on standing generally to 5.5 to 6.8, some of the formaldehyde becoming combined with rubber. The thus treated latex containing the formaldehyde and non-ionic surface active agent may be creamed with a hydrophilic colloidal creaming agent at such a pH between 5.5 and 6.8, but it is preferable to raise the pH to above 8, before or after the creaming, by the addition of an excess of ammonia over that necessary to react with the free formaldehyde (i. e. the formaldehyde not combined with the rubber) to form hexamethylene tetramine. This prevents thickening of the cream and ultimate coagulation. Primary amines, such as monomethylamine and monoethylamine, which act similarly to ammonia in that they remove free formaldehyde from the latex, may also be used to raise the pH of the latex to above 8. The ammonia addition in such case should generally be made within three days of the formaldehyde addition to prevent flocculation of the formaldehyde preserved latex on the alkali addition, as shown in U. S. Patent 2,327,115. The latex may be diluted with water as desired before creaming. The amount of formaldehyde addition may be from 0.05% to 1% by weight of the latex, the higher amounts in the range being used where alkali material is not subsequently added to the formaldehyde treated latex, and the lower amounts in the range being sufficient where alkali is added to the latex containing the formaldehyde before creaming, or is added to the cream. The amount of non-ionic surface active agent may be from 0.02 to 1% by weight of the latex.

Examples of non-ionic surface active agents that may be used in the present invention are reaction products of ethylene oxide or polyethylene glycol with organic compounds containing a radical having more than 8 (9 to 20) carbon atoms; such as: (1) reaction products of ethylene oxide or polyethylene glycol with long chain fatty alcohols, viz. monoethers of polyglycols with long chain fatty alcohols (e. g. reaction product of ethylene oxide and oleyl alcohol; $C_{18}H_{35}$—$(OC_2H_4)_nOH$, where $n$ is 10 to 20); (2) reaction products of ethylene oxide or polyethylene glycol with long chain fatty acids, viz. monoesters of polyglycols with long chain fatty acids (e. g. reaction product of ethylene oxide and oleic acid;

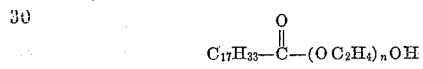

where $n$ is 10 to 20); (3) reaction products of ethylene oxide or polyethylene glycol with alkyl phenols, viz. monoethers of polyglycols with alkyl phenols (e. g. reaction product of ethylene oxide and isopropyl phenol;

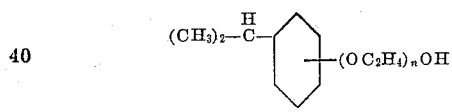

where $n$ is 10 to 20; reaction product of ethylene oxide and octyl phenol;

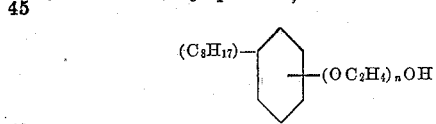

where $n$ is 10 to 20).

The hydrophilic colloidal creaming agents that may be used in the present invention are those conventionally used in creaming latex, for example, vegetable mucilages, such as alginates, pectates, extracts of the endosperms of leguminous plants belonging to the genera Cassia, Ceratonia, Caesalpinia and Poinciana, mucilages obtained from plants of the genera Astragalus and Acacia, from the seaweed *Chondrus crispus*, and from the stem of the cactus *Opuntia monocantha*, extracts of leaves of *Hibiscus rosasinensis* and of the pods of *Hibiscus esculentus*, extracts of Crocus and Amaryllis bulbs, and of the tubers of *Amorphophallus variabilis* and *rivieri*, and extracts of the seeds of *Tamarindus indica*, and the like. The amount of hydrophilic colloidal creaming agent is that conventionally used in creaming latex, generally between 0.02 and 0.5% of creaming agent based on the latex.

The following examples are illustrative of the invention, all parts referred to therein being by weight:

EXAMPLE I

In the following runs fresh latex was preserved with 0.2% formaldehyde based on the latex. Various amounts from 0.02 to 0.40% based on the latex of a non-ionic surface active agent which was the reaction product of ethylene oxide with oleyl alcohol were also added with the formaldehyde. Control samples were also run to which no surface active agent was added. After ageing 22 hours, each sample was ammoniated to 1.3% ammonia based on the latex, that is, by addition of ammonia in amount to give 1.3% excess of the ammonia required to combine with the formaldehyde in the latex. Ammonium alginate creaming agent in the amount of 0.05% based on the latex was added to the various samples. The latex concentrations were adjusted to 34% total solid and allowed to stand for creaming. Serum was drained after two days, and the two-day creams were analyzed for total solids content. The results are shown in the following table:

*Total solids (per cent) of creams at following concentrations (per cent) of non-ionic surface active agent*

| None | 0.02 | 0.05 | 0.10 | 0.15 | 0.20 | 0.30 | 0.40 |
|---|---|---|---|---|---|---|---|
| 51.8 | 53.1 | 55.2 | 54.5 | 55.3 | 56.3 | 57.8 | 57.9 |

The above shows the improvement in creaming fresh latex containing formaldehyde by the addition of a non-ionic surface active agent. Many anionic surface active agents, on the other hand, decrease the creaming rate of fresh latex containing formaldehyde and may cause coagulation as shown below.

Various anionic surface active agents were added to formaldehyde preserved latex similarly to the addition of the non-ionic surface active agent above. Various amounts of such non-ionic surface active agents were added and the latices were treated similarly to the above, i. e., after ageing 22 hours, each sample was ammoniated to 1.3% ammonia and creamed with 0.05% ammonia alginate, both based on the latex. The two-day creams (where coagulation had not taken place) were analyzed for total solids content. As shown in the following table, the concentrations of the creams with the anionic surface active agents used were less than the concentration of the cream without the addition of the anionic surface active agent as distinguished from the table above where the solids content of the creams were all greater with the addition of the non-ionic surface active agent than without such addition.

| Latex Total Solids (%) at Start of Creaming | Total Solids (%) of Creams at Following Concentrations (%) of Designated Surface-active Agent | | | | | | | |
|---|---|---|---|---|---|---|---|---|
| | None | 0.02 | 0.05 | 0.10 | 0.15 | 0.20 | 0.30 | 0.40 |
| | Sodium Salt of Sulfonated Dioctyl Ester of Succinic Acid | | | | | | | |
| 33.5 | 51.6 | 48.2 | 45.8 | coagulated | | | | |
| | Sodium Salt of Sulfonated Alkyl Ester of Higher Fatty Acid | | | | | | | |
| 32.3 | 49.4 | 49.1 | 48.1 | 46.8 | 45.2 | 42.5 | 41.5 | 39.8 |
| | Sodium Isopropyl Naphthalene Sulfonate | | | | | | | |
| 31.5 | 47.8 | 45.1 | 41.2 | coagulated | | | | |

EXAMPLE II

In this series of tests, samples of a 40% total solids fresh latex were preserved with 0.2% formaldehyde based on the latex. Various amounts of a different non-ionic surface active agent than used in Example I was added with the formaldehyde to the fresh latex. A control without such addition of non-ionic surface active agent was also run. The non-ionic surface active agent used was a reaction product of ethylene oxide with an alkyl phenol, otherwise known as an alkyl aryl polyethyl ether alcohol. The non-ionic surface active agent was added in amounts from 0.06% to 0.48% based on the latex. After ageing 20 hours, each sample was ammoniated to 1.3% ammonia and creamed to 0.05% ammonium alginate, both based on the latex. The serum was drained after 20 days and the 20 day creams were analyzed for total solids content. The results are shown in the following table:

*Total solids (per cent) of creams at following concentrations (per cent) of non-ionic surface active agent*

| None | 0.06 | 0.12 | 0.24 | 0.48 |
|---|---|---|---|---|
| 56.6 | 59.2 | 60.9 | 62.7 | 62.4 |

The non-ionic surface active agent again improved the creaming of fresh latex containing formaldehyde.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of concentrating natural Hevea rubber latex to over 50% rubber content which comprises adding to fresh natural Hevea rubber latex 0.05 to 1% of formaldehyde based on the latex and 0.02 to 1% based on the latex of a non-ionic surface active agent selected from the group consisting of monoethers of polyglycols with long chain fatty alcohols, monoesters of polyglycols with long chain fatty acids and monoethers of polyglycols with alkyl phenols, thereafter, within three days of the formaldehyde addition, adding ammonia to raise the pH of the latex above 8 and adding 0.02 to 0.5% of a vegetable mucilage creaming agent based on the latex, allowing the thus treated latex to stand until it separates into a cream fraction of over 50% rubber content and a serum fraction, and separating said cream and serum fractions from each other.

2. The method of concentrating natural Hevea rubber latex to over 50% rubber content which comprises adding to fresh natural Hevea rubber latex 0.05 to 1% of formaldehyde based on the latex and 0.02 to 1% based on the latex of a monoether of a polyglycol with a long chain fatty alcohol, thereafter, within three days of the formaldehyde addition, adding ammonia to raise the pH of the latex above 8 and adding 0.02 to 0.5% of a vegetable mucilage creaming agent based on the latex, allowing the thus treated latex to stand until it separates into a cream fraction of over 50% rubber content and a serum fraction, and separating said cream and serum fractions from each other.

3. The method of concentrating natural Hevea rubber latex to over 50% rubber content which comprises adding to fresh natural Hevea rubber latex 0.05 to 1% of formaldehyde based on the latex and 0.02 to 1% based on the latex of a monoester of a polyglycol with a long chain fatty acid, thereafter, within three days of the formaldehyde addition, adding ammonia to raise the pH of the latex above 8 and adding 0.02 to 0.5% of a vegetable mucilage creaming agent based on the latex, allowing the thus treated latex to stand until it separates into a cream fraction of over 50% rubber content and a serum fraction, and separating said cream and serum fractions from each other.

4. The method of concentrating natural Hevea rubber latex to over 50% rubber content which comprises adding to fresh natural Hevea rubber latex 0.05 to 1% of formaldehyde based on the latex and 0.02 to 1% based on the latex of a monoether of a polyglycol with an alkylated phenol, thereafter, within three days of the formaldehyde addition, adding ammonia to raise the pH of the latex above 8 and adding 0.02 to 0.5% of a vegetable mucilage creaming agent based on the latex, allowing the thus treated latex to stand until it separates into a cream fraction of over 50% rubber content and a serum fraction, and separating said cream and serum fractions from each other.

5. A concentrated natural Hevea rubber latex of over 50% rubber content having a pH above 8 and containing small amounts of a non-ionic surface active agent selected from the group consisting of monoethers of polyglycols with long chain fatty alcohols, monoesters of polyglycols with long chain fatty acids and monoethers of polyglycols with alkyl phenols, and a vegetable mucilage creaming agent, the rubber of said latex containing a small amount of combined formaldehyde.

6. A concentrated natural Hevea rubber latex of over 50% rubber content having a pH above 8 and containing small amounts of a monoether of a polyglycol with a long chain fatty alcohol and a vegetable mucilage creaming agent, the rubber of said latex containing a small amount of combined formaldehyde.

7. A concentrated natural Hevea rubber latex of over 50% rubber content having a pH above 8 and containing small amounts of a monoester of a polyglycol with a long chain fatty acid and a vegetable mucilage creaming agent, the rubber of said latex containing a small amount of combined formaldehyde.

8. A concentrated natural Hevea rubber latex of over 50% rubber content having a pH above 8 and containing small amounts of a monoether of a polyglycol with an alkylated phenol and a vegetable mucilage creaming agent, the rubber of said latex containing a small amount of combined formaldehyde.

JOHN S. RUMBOLD.

REFERENCES CITED

The following references are of record in the file of this patent:

UNITED STATES PATENTS

| Number | Name | Date |
|---|---|---|
| 1,699,369 | McGavick | Jan. 15, 1929 |
| 2,138,073 | Schweitzer | Nov. 29, 1938 |
| 2,215,562 | Ogilby | Sept. 24, 1940 |
| 2,327,115 | Linscott et al. | Aug. 17, 1943 |